(12) United States Patent  (10) Patent No.: US 7,954,878 B1
Hinton  (45) Date of Patent: Jun. 7, 2011

(54) ARCH-BASED VEHICLE ELEMENT

(75) Inventor: Golden Hinton, Athens, GA (US)

(73) Assignee: Golden Hinton, Athens, CA (US)

( * ) Notice: Subject to any disclaimer, the term of this patent is extended or adjusted under 35 U.S.C. 154(b) by 0 days.

(21) Appl. No.: 12/537,636

(22) Filed: Aug. 7, 2009

(51) Int. Cl.
*B60R 21/13* (2006.01)
*B62D 25/06* (2006.01)

(52) U.S. Cl. ............... 296/104; 280/756; 135/88.09

(58) Field of Classification Search ............ 296/187.03, 296/187.12, 146.6, 102, 104, 193.12; 280/756; 135/88.05, 88.09
See application file for complete search history.

(56) References Cited

U.S. PATENT DOCUMENTS

| | | |
|---|---|---|
| 4,098,525 A | 7/1978 | Schwanz |
| 4,600,621 A | 7/1986 | Maurer |
| 4,840,832 A | 6/1989 | Weinle |
| 5,460,409 A | 10/1995 | Conner |
| 5,709,407 A | 1/1998 | Stephens |
| 5,823,611 A | 10/1998 | Daniel |
| 5,833,304 A | 11/1998 | Daniel |
| 6,234,526 B1 | 5/2001 | Song |
| 6,315,326 B1 | 11/2001 | Muller et al. |
| 6,464,250 B1 | 10/2002 | Faigle |
| 6,475,937 B1 | 11/2002 | Preisler |
| 6,520,568 B2 | 2/2003 | von Holst |
| 6,591,576 B1 * | 7/2003 | Iida et al. ............ 52/843 |
| 6,772,544 B2 * | 8/2004 | Takemura et al. ........ 37/347 |
| 7,182,908 B2 | 2/2007 | Preisler |
| 2003/0021956 A1 | 1/2003 | Preisler |

* cited by examiner

*Primary Examiner* — Glenn Dayoan
*Assistant Examiner* — Melissa A Black

(57) ABSTRACT

The invention is an arch-based structural element designed to offer the resistance of the apex curvature of the arch to present to and intercept a force (an automobile collision). The resistance of the arch and its construction using strong lightweight materials give auto passengers the maximum degree of safety as well as lower consumption of fuel associated with weigh reduction.

3 Claims, 2 Drawing Sheets

ARCH-BASED VEHICLE ELEMENT

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to structural elements, and more particularly to an arch-based structural element for use in vehicles.

DISCUSSION OF RELATED ART

Protective roof structures for vehicles are well known in the art. For example, U.S. Pat. No. 6,520,568 to von Holst et al. on Feb. 18, 2003 shows such a device. Such devices are made to protect occupants from injury when a vehicle rollovers or is involved in a crash. However, despite the development of many approaches to protective structures for vehicles, these approaches do not combine maximum strength, minimum weight in an arch based construct.

Another approach is the use of specialized vehicle roofs to provide extra protection. For example, U.S. Pat. No. 6,520,568 to von Holst et al. on Feb. 18, 2003 shows an inner roof structure for occupant protection in vehicle. U.S. Pat. No. 6,475,937 to Preisler et al. on Nov. 5 and U.S. Pat. No. 7,182,908 to Preisler et al. on Feb. 27, 2007 teach a thermoplastic headliner with an energy absorbing head-impact mechanism.

Also, U.S. Pat. No. 5,833,304 to Daniel et al. on Nov. 10, 1998 shows a headliner with integral impact absorption panels. However, despite the benefits provided by the above approaches, none of these approaches protect the occupants of a vehicle from side, rollover, front, rear and angle collisions. Therefore a construct is needed that provides protection from such a collision.

Therefore, there is a need for a construct that provides maximum strength with minimum weight while using the advantageous quality of an arched based element to provide protection from side, rollover, front, rear, and angle collisions. The present invention accomplishes these objectives.

SUMMARY OF THE INVENTION

The present device is an arch-based vehicular element. The arch-based vehicular element includes a curved sheet terminating on opposite sides as an increase in curvature to form two pipes, the two pipes thus formed as joined semi-circular arches and the curved sheet forming an arch between the two pipes. The arch-based vehicular element is used in a vehicle to provide a protective enclosure for the vehicle's occupants. The arched pipes and curved sheet are formed from a thermoplastic, composite, or other such light and strong material.

In one embodiment, the arch-based vehicular element terminates at two opposing ends, whereby each end of the arch-based vehicular element may be fixed to the vehicle. In another embodiment, the curvatures of the curved sheet and/or of the pipes can be changed to fit in a vehicle while maintaining an arch based construct to provide a protective enclosure. The arch is used additionally in the frame and/or the body of the vehicle.

The present invention is an element that provides maximum strength with minimum weight. Further, the device provides protection from collisions occurring whereupon the force of such collision could be from various directions or angles. Other features and advantages of the present invention will become apparent from the following more detailed description, taken in conjunction with the accompanying drawings.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be or may not be practiced without such details. In this instance, well-known structures and functions are not redundantly shown or described.

Throughout, unless the context clearly requires otherwise, the description and the claims, words, clauses, and sentences are to be construed as "including but not limited to." The words "herein," "above," "below" and words of similar designation, when used in this application, shall refer not only to the application as a whole but as well to a particular portion of the application.

Figure 1:
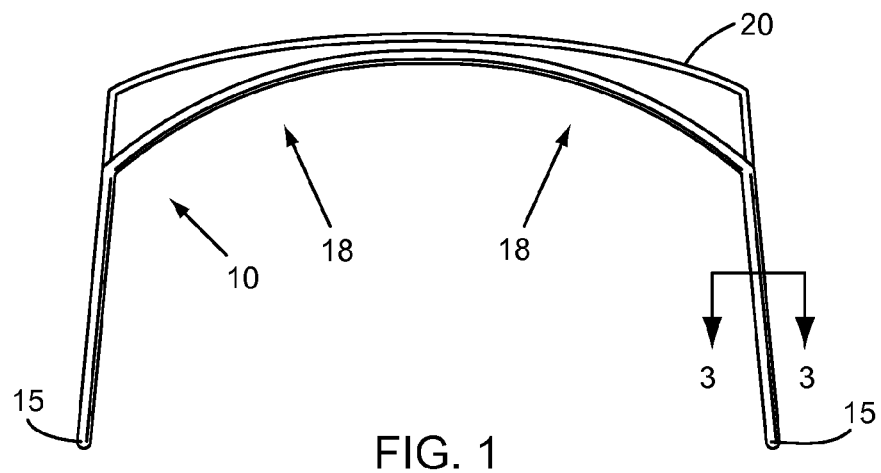
FIG. 1 is front elevational view of the invention in a vehicle.
Figure 2:
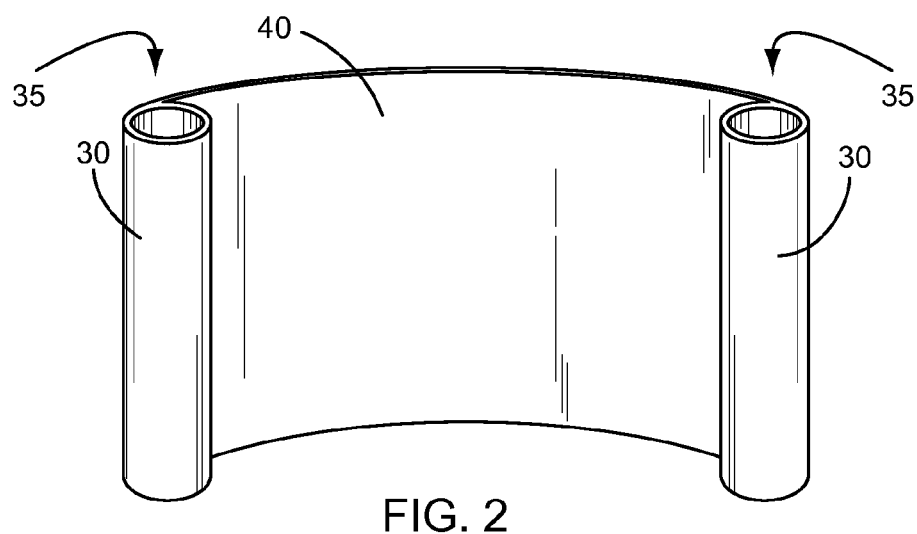
FIG. 2 is a partial perspective view of the invention.
Figure 3:
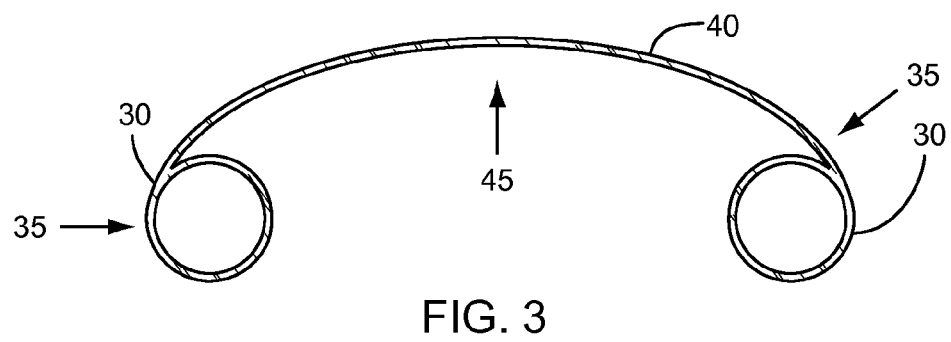
FIG. 3 is a cross section of the invention, taken generally along lines 3-3 of FIG. 1.

With respect to the drawings, FIG. 1 illustrates an arch-based vehicular element 10. As illustrated in FIG. 2, the arch-based vehicular element 10 includes a curved sheet 40 terminating on opposite sides 35 as an increase in curvature to form two pipes 30. The two pipes 30 thus formed as joined semi-circular arches and the curved sheet 40 forming an arch 45 (FIG. 3) between the two pipes 30; The arch-based vehicular element 10 may be used in a vehicle 20 to comprise a protective enclosure 18 for occupants thereof, as illustrated in FIG. 5.

Figure 5:
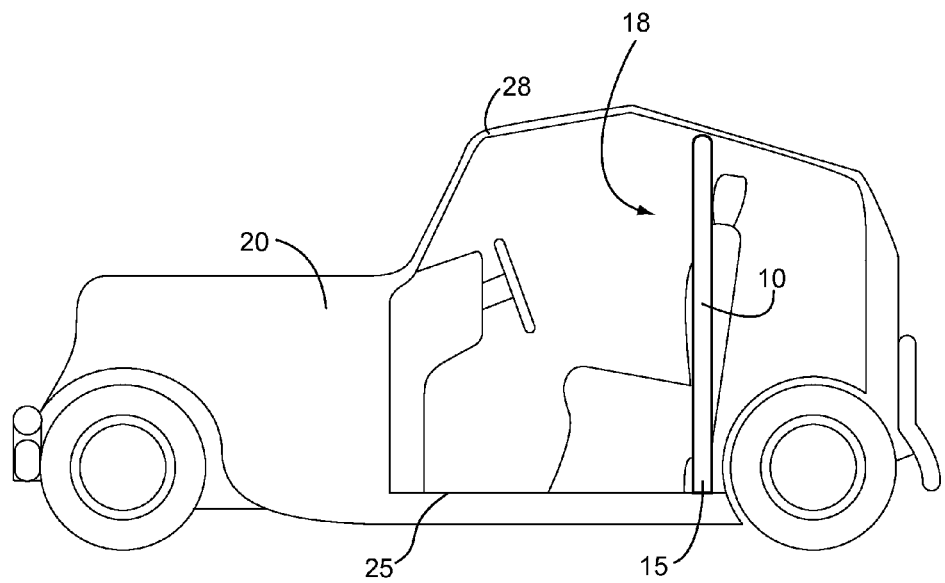
FIG. 5 is a side elevational view of the invention in a vehicle.

As illustrated in FIG. 5, the arch-based vehicular element 10 terminates at two opposing ends 15, whereby each end 15 of the arch-based vehicular element 10 may be fixed with the vehicle 20, such as with mechanical fasteners (not shown), adhesive bonding (not shown), or the like. In another embodiment, the curvatures of the curved sheet 40 and/or of the pipes 30 can be changed to fit in a vehicle 20 while maintaining an arch based construct to provide a protective enclosure 18. Furthermore, the curvatures of the curved sheet 40 and/or of the pipes 30 can be adjusted to fit within and be attached as needed to the vehicle frame 25, unibody, or any other such name when applied to a vehicle's enclosure structure.

In one preferred embodiment, the curved sheet 40 and arched pipes 30 are formed from a thermoplastic, composite, or other strong yet light-weight material, by processes including extrusion, injection molding, or the like. Such a composite material may be a composite carbon fiber material, a fiberglass and resin composite, or the like.

The invention uses the arch-based vehicular element 10 to provide strength, lightness, and versatility. Further, by having each end 15 of the arch-based vehicular element 10 attach to the frame 25 of the vehicle 20 thereby passing above the occupant and also along the side of the occupant, the arch-based vehicular element 10 provides protection from rollover, side impact, and other collision directions.

In another description of the invention, FIG. 1 illustrates the arch-based vehicular element 10 including a pair of substantially parallel arched pipes 30. As illustrated in FIG. 2, the curved sheet 40 spans the distance between each arched pipe 30 and intersecting each arched pipe 30 tangentially. The curved sheet 40 and arched pipes 30 are integrally formed.

Figure 4:
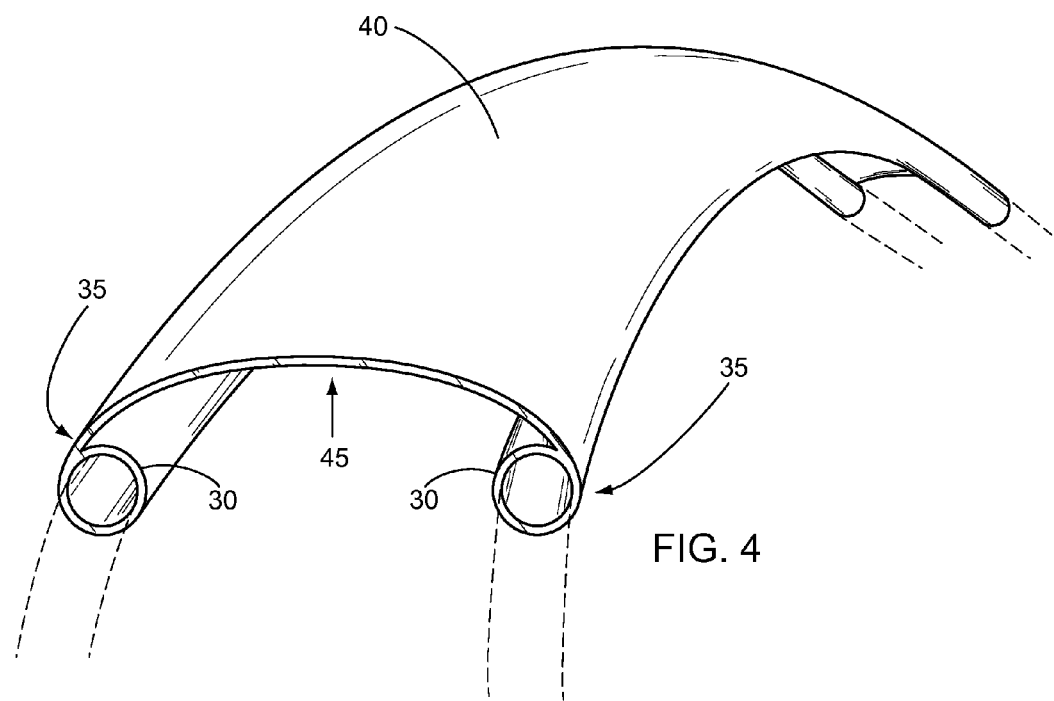
FIG. 4 is a partial perspective view of the invention.

In another description of the invention, FIG. 5 illustrates the arch-based vehicular element 10 for use in a vehicle 20 having a roof 28 and a frame 25. As illustrated in FIGS. 4 and 5, the arch-based vehicular element 10 includes a pair of substantially parallel arched pipes 30 fixed within the roof 28 and fixed to a portion of the vehicle frame 25 at either end 15 thereof.

While a particular form of the invention has been illustrated and described, it is apparent that various modifications can be made without departing from the spirit and scope of the arch based element, the invention. For example, more than one arch-based vehicular element 10 may be used in a vehicle 20 to provide additional protection for occupants in all areas of the vehicle.

The information provided can be applied to other systems, other than the system described herein. The elements and acts of the various embodiments thus can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, nevertheless, the invention can be used in different ways. Details of the system may vary considerably in implementation, while retaining the arch base of the invention.

All of the above patents and applications and other references, including any that may be listed in accompanying filing papers, are incorporated herein by reference. Aspects of the invention can be modified, if necessary, to employ the systems, functions, and concepts of the various references described above to provide even further embodiments of the invention.

While certain aspects of the invention are presented below in claim form, the inventor reserves the right, if possible, to add additional claims after filing this application.

What is claimed is:

1. An arch-based vehicular element comprising:
   a pair of semi-circular substantially parallel arched pipes;
   a curved sheet spanning the distance between each arched pipe and intersecting each arched pipe tangentially, wherein the curved sheet and arched pipes are formed in one piece;
   said arch-based vehicle element terminates at two opposing ends and is fixed to a vehicle frame near a floor portion at said opposing ends on left and right sides of a vehicle and arches over and interior portion of said vehicle, wherein said arch-based vehicular element is used in said vehicle to provide a protective enclosure for occupants thereof.

2. The arch-based vehicular element of claim 1 wherein the arched pipes and curved sheet are formed from a composite material.

3. The arch-based vehicular element of claim 1 wherein the arched pipes and curved sheet are formed from a thermoplastic material.

\* \* \* \* \*